United States Patent [19]

Grünberger et al.

[11] Patent Number: 5,837,369
[45] Date of Patent: Nov. 17, 1998

[54] MULTILAYER POLYPROPYLENE-BASED PACKAGING FILM AND ITS USE

[75] Inventors: Manfred Grünberger, Traun; Paul De Mink, Freistadt; Anton Wolfsberger, Engerwitzdorf, all of Austria

[73] Assignee: PCD Polymere Gesellschaft m.b.H., Austria

[21] Appl. No.: 724,229

[22] Filed: Sep. 27, 1996

[30] Foreign Application Priority Data

Sep. 28, 1995 [AT] Austria ..................... 1606/95

[51] Int. Cl.$^6$ .................................. B32B 7/12
[52] U.S. Cl. ................... 428/349; 428/512; 428/513; 428/516; 53/478
[58] Field of Search ................... 428/349, 512, 428/513, 516; 53/478

[56] References Cited

U.S. PATENT DOCUMENTS

| | | |
|---|---|---|
| 4,766,018 | 8/1988 | Hinrichsen et al. . |
| 4,842,930 | 6/1989 | Schinkel et al. . |
| 5,023,121 | 6/1991 | Pockat et al. . |
| 5,122,415 | 6/1992 | Schinkel et al. . |
| 5,234,733 | 8/1993 | Schloegl et al. . |
| 5,436,041 | 7/1995 | Murschall et al. . |

FOREIGN PATENT DOCUMENTS

| | | |
|---|---|---|
| 0 258 527 | 3/1988 | European Pat. Off. . |
| 92 04 518.9 | 8/1992 | United Kingdom . |
| 43 14 214 | 11/1994 | United Kingdom . |

*Primary Examiner*—Christopher Raimund
*Attorney, Agent, or Firm*—Wenderoth, Lind & Ponack

[57] ABSTRACT

A packaging film which comprises
  a) a sealing ply comprising a mixture of
    $a_1$) 40 to 80% by weight of a $C_2$–$C_3$ random copolymer having a $C_2$ content of 1–15% by weight or
    $a_2$) 40 to 80% by weight of a polymer blend consisting of
      $a_{2.1}$) 60 to 98% by weight of a crystalline copolymer of propylene with ethylene and/or an α-olefin of the general formula $CH_2$=CHR, where R is a linear or branched alkyl radical having 2–8 carbon atoms, containing 85–99.5% by weight of propylene, and
      $a_{2.2}$) 2 to 40% by weight of a resilient copolymer of ethylene with propylene and/or an α-olefin of the general formula $CH_2$=CHR, containing 20–70% by weight of ethylene, or
    $a_3$) 40 to 80% by weight of a highly amorphous polypropylene having a crystalline polypropylene fraction of up to 10% by weight with an enthalpy of fusion of not more than 40 J/g and a melt flow index between 0.1 and 100 g/10 min, where the polypropylene may be a homopolymer of propylene or a copolymer of propylene with one or more α-olefins and with a propylene fraction of at least 80 mol %, and
    $a_4$) 20 to 60% by weight of an ethylene polymer and
  b) a monolayer or multilayer base ply comprising thermoplastic polymers,
the packaging film being peelable after sealing against a polypropylene ply with a force of not more than 30N/15 mm, and its use.

11 Claims, No Drawings

MULTILAYER POLYPROPYLENE-BASED PACKAGING FILM AND ITS USE

Packaging films based on plastics are already known from the literature since they can generally be readily processed, have a low weight and are resistant to environmental influences and their appearance can be greatly modified. The packaging films have to meet a very wide range of requirements. On the one hand, the packaging must be sufficiently tight to provide adequate protection for the packed or sealed-in goods, in particular foods and drugs, and to make handling of the sealed products sufficiently safe, in particular during transport; on the other hand, the criterion of easy peelability on opening the packaging should be fulfilled, and the packaging film should be peelable not only readily but in a defined manner, i.e. the film must not tear in unintended areas. As a third criterion, the packaging film should furthermore have good processibility so that the films are sealable even at temperatures which are as low as possible and with as many different polypropylene-based films or shaped articles as possible. These criteria could not always be adequately realized with packagings known to date, as disclosed, for example, in EP-B-0178061, EP-B-0292 192 or EP-A1-588223, and it is therefore the object to find novel packaging films which fulfill the abovementioned criteria and are distinguished by a mechanical stability which is improved compared with the prior art, good tightness, easy peelability and simple processibility. This object could be achieved, according to the invention, by a packaging film whose sealing ply comprises a mixture of $C_2$–$C_3$ random copolymers or random block copolymers or highly amorphous polypropylene polymers with an ethylene polymer.

The present invention accordingly relates to a packaging film which comprises a) a sealing ply comprising a mixture of $a_1$) 40 to 80% by weight of a $C_2$–$C_3$ random copolymer having a $C_2$ content of 1–15% by weight or $a_2$) 40 to 80% by weight of a polymer blend consisting of $a_{2.1}$) 60 to 98% by weight of a crystalline copolymer of propylene with ethylene and/or an $\alpha$-olefin of the general formula $CH_2$=CHR, where R is a linear or branched alkyl radical having 2–8 carbon atoms, containing 85–99.5% by weight of propylene, and $a_{2.2}$) 2 to 40% by weight of a resilient copolymer of ethylene with propylene and/or an $\alpha$-olefin of the general formula $CH_2$=CHR, containing 20–70% by weight of ethylene, or $a_3$) 40 to 80% by weight of a highly amorphous polypropylene having a crystalline polypropylene fraction of up to 10% by weight with an enthalpy of fusion of not more than 40 J/g and a melt flow index between 0.1 and 100 g/10 min, where the polypropylene may be a homopolymer of propylene or a copolymer of propylene with one or more $\alpha$-olefins and with a propylene fraction of at least 80 mol %, and $a_4$) 20 to 60% by weight of an ethylene polymer and b) a monolayer or multilayer base ply comprising thermoplastic polymers, the packaging film being peelable after sealing with a force of not more than 30N/15 mm.

The sealing ply a) of the packaging film according to the invention may thus consist of a mixture of $a_1$) 40–80% by weight of a $C_2$–$C_3$ random copolymer and $a_4$) 20 to 60% by weight of an ethylene polymer. The $C_2$ content of the random copolymer is 1–15% by weight, preferably 4–9% by weight. Furthermore, the sealing ply may contain a $C_2$–$C_3$ polymer blend $a_2$) instead of the $C_2$–$C_3$ random copolymer $a_1$).

This $C_2$–$C_3$ polymer blend is to be understood as meaning copolymers or random block copolymers of propylene and ethylene and/or an $\alpha$-olefin of the formula $CH_2$=CHR, which are obtained, on the basis of conventional block copolymer preparation processes, by preparing, in the 1st step or in the 1st reactor, not a pure polypropylene (PP) homopolymer but an ethylene/propylene random copolymer, into which ethylene/propylene rubber blocks (EPR) are incorporated by polymerization in the 2nd step or in the 2nd reactor from a corresponding monomer mixture. The preparation can be carried out, for example, analogously to EP-A-0 373 660.

The polymer blend $a_2$) contains $a_{2.1}$) 60–98% by weight of a crystalline copolymer of propylene with ethylene and/or an $\alpha$-olefin of the general formula $CH_2$=CHR. R denotes a linear or branched alkyl radical having 2–8 carbon atoms. Examples of suitable comonomers are butene, pentene or hexene. Propylene/ethylene copolymers are preferred. The amount of propylene in the copolymer is between 85 and 99.5% by weight, preferably between 90 and 98% by weight. The second component $a_{2.2}$) of the polymer blend $a_2$ contains 2 to 40% by weight of a resilient copolymer of ethylene with propylene and/or an $\alpha$-olefin of the general formula $CH_2$=CHR. Once again, R has the above meaning. Ethylene/propylene copolymers are preferred. The amount of ethylene is 20 to 70% by weight, preferably 25 to 60% by weight.

As a third possibility, the sealing ply may contain a highly amorphous polypropylene $a_3$) instead of $a_1$ or $a_2$. Highly amorphous polypropylenes are to be understood as meaning polypropylenes which have a crystalline polypropylene fraction of not more than 10% by weight, preferably of not more than 7% by weight, with an enthalpy of fusion of not more than 40 J/g, preferably not more than 30 J/g. The melt flow index of the highly amorphous polypropylenes is between 0.1 and 100 g/10 min, preferably between 0.5 and 50 g/10 min. The highly amorphous polypropylenes used may be both homopolymers of propylene and copolymers of propylene with one or more $\alpha$-olefins. Suitable comonomers are $\alpha$-olefins having 2–10 C atoms, such as ethylene, butene, pentene, hexene or decene. Ethylene is preferably used as the comonomer. The propylene fraction of the copolymers is at least 80 mol %, preferably at least 85 mol %.

20 to 60% by weight of an ethylene polymer are used as component $a_4$). An ethylene polymer is to be understood as meaning both homopolymers of ethylene and copolymers of ethylene with other comonomers. Suitable copolymers of ethylene also contain, for example, minor amounts of unsaturated comonomers, for example of vinyl acetate or of $C_3$- to $C_{10}$-alkylenes, for example of propylene, butene, hexene or octene. However, homopolymers are preferably used. The homopolymers used have a density of 0.89 to 0.98 g/cm$^3$. Low density polyethylenes (LDPE) having a density between 0.915 and 0.935 g/cm$^3$ are particularly preferably used.

The sealing ply can, if desired, contain conventional additives, such as, for example, stabilizers, hydrocarbon resins, dyes, pigments, antioxidants, lubricants, antistatic agents, UV absorbers, viscosity modifiers, antiblocking agents, impact modifiers, dulling agents, flameproofing agents, biostabilizers, nucleating agents, curing agents, etc. If required, conventional fillers may also be added. Suitable fillers are, for example, silicas, in particular in the form of glass or quartz, silicates, in particular in the form of talc, titanates, $TiO_2$, alumina, calcium carbonates, in particular in the form of chalk, magnesite, MgO, iron oxides, silicon carbides or nitrides, barium sulfate, kaolin and the like. However, the sealing ply preferably contains no filler.

For the production of the sealing ply a) to be used according to the invention, the random copolymer $a_1$), the random block copolymer $a_2$) or the highly amorphous polypropylene $a_3$) and the desired ethylene polymer $a_4$) are mixed with one another in suitable apparatuses, for example in extruders or mixers, and further processed by conventional technologies.

The sealing ply a) preferably has a ply thickness of 4 to 50, particularly preferably 8 to 25, μm. In addition to the sealing ply, the packaging film according to the invention contains a base ply b) which may be either monolayer or multilayer and comprises a thermoplastic polymer or a mixture of a plurality of thermoplastic polymers.

Suitable thermoplastic polymers are all conventional, thermoplastically deformable plastics. Examples of such thermoplastics are polyolefins, polyamides, polyesters, polystyrenes, polyoxyalkylenes, polyvinyl chloride, polyether sulfones, polyurethanes, polyethylene terephthalate, polybutylene terephthalate, polyimides, polyetherketones, polycarbonate, etc. Polyolefins are preferably used as the base ply, particularly preferably polypropylenes (PP). Polypropylenes are to be understood as meaning both PP homopolymers and block copolymers, random copolymers or random block copolymers containing minor amounts of other $C_2$- to $C_{10}$-alkenes or mixtures thereof. When PP homopolymers are used, highly crystalline PP may also be employed. Suitable highly crystalline PP comprises, for example, polypropylenes as described in EP-B-0 255693, preferably those having a high isotactic pentad content of between 0.955 and 1.0 (method of measurement described in EP-B-0255693).

If desired, up to 50% by weight, preferably 10 to 20% by weight, of fillers may also be added to the thermoplastics. Once again, suitable fillers are the fillers already described. The base ply may also contain further conventional additives analogously to the sealing ply.

As already mentioned above, the base ply b) may be monolayer or multilayer, resulting in different structure variants.

Preferred variants are the following:

In variant 1), the base ply consists of only one ply $b_1$) of one of the abovementioned thermoplastics or a mixture of a plurality of thermoplastics, which, if required, may contain one or more of the conventional fillers described above. The ply $b_1$) preferably consists of a polyolefin, particularly preferably polypropylene, with or without a filler. The polypropylene may be a PP homopolymer, a highly crystalline PP homopolymer or a mixture thereof or a mixture with a PP block copolymer or random block copolymer or random copolymer, the copolymers containing a minor amount of other $C_2$- to $C_{10}$-alkenes.

In variant 2), the base ply consists of the plies $b_1$, and an additional ply $b_2$), which acts as a top ply. The ply $b_1$) corresponds to the ply described in variant 1. The top ply $b_2$) likewise preferably consists of the polypropylenes described above, for example comprising PP homopolymer or highly crystalline PP homopolymer.

The top ply $b_2$) can, if desired, also be composed of another of the abovementioned thermoplastics, preferably of thermoplastics having higher heat distortion resistance, such as polyamide, polyethylene terephthalate, polycarbonate or polyoxyalkylenes, or of paper. It is advantageous to introduce one or more adhesion promoter plies $b_3$) between $b_1$) and $b_2$). For example, conventional polyether- or polyester-based laminating adhesives and conventional polymeric adhesion promoters are suitable for the adhesion promoter ply $b_3$).

In a further variant (variant 3), the base ply may additionally contain a barrier ply $b_4$), for example comprising polyamide, polyethylene terephthalate or ethylene/vinyl alcohol, in order to prevent, for example, the entry of oxygen.

Various ply sequences may be obtained. For example, the following ply sequences are preferred in the base ply
$b_1$-$b_3$-$b_4$-$b_3$-$b_2$ or
$b_1$-$b_3$-$b_4$-$b_2$.

In the case of all of the abovementioned variants and other ply sequences of the plies $b_1$ to $b_4$, a lacquer layer, for example comprising lacquer having high heat distortion resistance, a metal layer and metal oxide layers, for example comprising $SiO_2$, MgO or $Al_2O_3$, which, if required, may also be lacquered, can, if desired, be applied to the last of these plies or to the outer surface of the base ply.

It is also possible to print the film by conventional methods.

The total ply thickness of the base ply b is about 20 to 3000 μm, preferably about 50 to 2000 μm.

The packaging film according to the invention is usually produced by applying the sealing ply a) as uniformly as possible to the base ply b). Such production processes for multilayer films are carried out, for example, by the coextrusion, chill-roll, blown film or calender process and/or by coextrusion coating or by the lamination process.

In the case of the coating process, for example, the coating material to be used is first applied to a carrier sheet, after which the operations of gelling, cooling, peeling and winding are carried out. In the actual coextrusion coating, coating is carried out in a coating unit with a melt film which is melted in an extruder and discharged via a slot die and may consist of one or more polymer plies. The resulting laminate of the sealing ply a) and the base ply b) is then cooled and calendered in a chill-roll unit. The laminate is then wound in an appropriate winding station.

In the lamination process, the operations for application of the coating material to the carrier sheet, calendering and cooling, peeling and winding are likewise carried out analogously to the coating process. In the actual extrusion lamination, a prefabricated carrier sheet is allowed to run into a calender which has 3 or 4 rolls. The carrier sheet is coated before the first roll nip with a melt film which is melted in an extruder and discharged via a slot die. Before the second roll nip, a second prefabricated sheet is allowed to run in. The resulting total laminate is calendered on passing through the second roll nip, then cooled, peeled off and wound in a winding station.

In the coextrusion blow molding or flat sheet coextrusion process, in general the mixture of the sealing ply a) and the thermoplastic polymer of the base ply b) are first melted in different extruders under suitable conditions and then combined in the form of the melt streams with formation of a multilayer melt stream in the coextrusion die. This is followed by discharge, peeling and cooling of the multilayer melt sheet and winding of the laminate.

The different process variants can if required also be combined with one another, depending on the desired film structure.

Such processes are usually carried out at temperatures of 170° to 280° C. and pressures of 70 to 250 bar and in average throughput times of 5 to 20 min. The sealing ply a) is applied, for example, to a base ply b) which is formed as a monolayer or multilayer flexible cover film or as a monolayer or multilayer deep-drawn film.

In the case of the flexible cover film, a film having a total thickness of the plies a+b of 30 to 400 μm, preferably 50 to 250 μm, is produced. The cover film thus obtained is then sealed via the sealing ply with an appropriate polypropylene-based packaging material, such as, for example, a deep-drawn PP container, by means of conventional sealing and welding methods. The seal contact side is preferably a PP ply. After sealing, the resulting seal seam strength withstands a bursting pressure of over 200 mbar without bursting. The packs thus obtained are opened by simply peeling off the cover film with application of slight force of not more than 30N/15 mm according to ISO 527.

Furthermore, flexible films having a total thickness of the plies a+b of about 30 to 150 μm can be sealed with one another so that a bag film is obtained, it being possible to separate the films easily by gently peeling them apart. The following variants are preferred:
- b+a sealed against b+a or
- b+a sealed against a monofilm consisting of a polypropylene, suitable polypropylenes being PP homopolymers, PP block copolymers, PP random copolymers and PP random block copolymers, or
- b+a sealed against a multilayer film consisting of a sealing ply of polypropylene and one or more base plies of thermoplastic polymers.

A further application is the production of a thermoforming film having a total thickness of the plies a+b of 150 to 350 μm. The thermoforming film is deep-drawn to give a cover and can be readily sealed onto a packaging container, for example a dish or a cup, the seal contact side being a PP ply. Here too, the pack can be opened by gently peeling off the deep-drawn cover with a force of not more than 30N/15 mm. Preferably, a force of not more than 15N/15 mm is required for opening.

The sealing ply a may furthermore be applied to a preferably 0.15 to 3 mm thick, monolayer or multilayer deep-drawn film, for example by means of a calendering process or of a chill-roll process, and then be thermoformed or deep-drawn to give deep-drawn packaging containers in which the sealing ply is included on the inside. The plies of the deep-drawn film correspond to the base ply b described above. Sealing of the package thus obtained is then effected with any desired cover films which consist of one or more plies of polypropylene or of a combination of different thermoplastics, the seal contact side preferably being a PP ply, particularly preferably a PP homopolymer ply. The advantage of these deep-drawn packaging containers is that they can be deep-drawn and shaped in a single process step and that in particular there is no need for subsequent introduction of grooves, notches, etc. for defining the pull-off area or tear area for defined opening of the packaging container.

The sealing temperature is in each case between about 85° and 240° C., preferably between 120° and 200° C., depending on the total film thickness.

The packagings or packaging films according to the invention are distinguished by simple processability, easy peelability or openability, good tightness and high mechanical stability, so that they are suitable for use for easily openable packages of any type, i.e. for the nonfood and food sectors. They are preferably used in the food sector, particularly preferably for packing dairy products, such as, for example, yoghurt.

EXAMPLES 1–3

The following films with 3 layers and with a ply sequence a(10 μm)-b$_1$(60 μm)-b$_2$(10 μm) have been prepared by coextrusion:

Film 1 sealing ply a: consisting of
 a$_1$: 60% by weight of a statistic polypropylene (PP) with a C$_2$ content of 6,5% by weight of ethylene MFI (230/2.16)=8 g/10 min and
 a$_4$: 40% by weight of an ethylene polymer with a density of 0.923 g/cm$^3$, MFI (190/2.16)=0,75 g/10 min
base ply consisting of
 b$_1$: mixture of 60% by weight of a PP-block copolymer with MFI (230/2.16)=5 g/10 min and 40% by weight of a highly crystalline PP homopolymer with MFI (230/2.16)=8 g/10 min. and
 b$_2$: highly crystalline PP homopolymer with MFI (230/2.16)=8 g/10 min Film 2 sealing ply a: consisting of
 a$_3$: 60% by weight of a highly amorphous PP with an enthalpy of fusion of about 25 J/g and a MFI (230/2.16) of 12 g/10 min and
 a$_4$: 40% by weight of an ethylene polymer with a density of 0.923 g/cm$_3$, MFI (190/2.16)=0.75 g/10 min
base ply analogous film 1

Film 3 sealing ply a: consisting of a mixture of
 a$_2$: 60% by weight of a mixture of crystalline PP/ethylene copolymer with 5.4% by weight C$_2$ content and an elastic ethylene/PP copolymer with a content of EPR of 15% by weight (RAHECO$^R$, MFI (230/2.16)=10 g/10 min) and
 a$_4$: analogous film 1
base ply analogous film 1

The films have been sealed against a PP-homopolymer film with a MFI (230/2.16) of 3 g/10 min and a thickness of 300 μm.
Sealing temperature: 120°–180° C., sealing time: 0.5 sec, sealing pressure: 0.8N/mm$^2$
With a tensile test the peel strength dependent on the sealing temperature of the sealing ply was measured.
Angle of peeling: 180°
Velocity of peeling: 100 mm/min
Breadth of sample: 15 mm

| | peel strength [N/15 mm] at a sealing temperature of | | | |
|---|---|---|---|---|
| Film | 120° C. | 140° C. | 160° C. | 180° C. |
| 1 | 2.0 | 6.5 | 7.5 | 9.5 |
| 2 | 2.5 | 5.5 | 7.0 | 8.5 |
| 3 | 2.0 | 6.0 | 8.0 | 9.5 |

What we claim is:
1. A packaging film which comprises:
a) a sealing ply comprising a mixture of:
 a$_1$) 40 to 80% by weight of a C$_2$–C$_3$ random copolymer having a C$_2$ content of 1–15% by weight or
 a$_2$) 40 to 80% by weight of a polymer blend consisting of
 a$_{2.1}$) 60 to 98% by weight of a crystalline copolymer of propylene with ethylene and/or an α-olefin of the general formula CH$_2$=CHR, where R is a linear or branched alkyl radical having 2–8 carbon atoms, containing 85–99.5% by weight of propylene, and

$a_{2.2}$) 2 to 40% by weight of a resilient copolymer of ethylene with propylene and/or an α-olefin of the general formula $CH_2=CHR$, containing 20–70% by weight of ethylene, or $a_3$) 40 to 80% by weight of a highly amorphous polypropylene having a crystalline polypropylene fraction of up to 10% by weight with an enthalpy of fusion of not more than 40 J/g and a melt flow index between 0.1 and 100 g/10 min, where the polypropylene may be a homopolymer of propylene or a copolymer of propylene with one or more α-olefins and with a propylene fraction of at least 80 mol %, and $a_4$) 20 to 60% by weight of an ethylene polymer and b) a monolayer or multilayer base ply comprising thermoplastic polymers, the packaging film being peelable after sealing against a polypropylene ply with a force of not more than 30N/15 mm.

2. The packaging film as claimed in claim 1, which can be peeled off with a force of not more than 15N/15 mm after sealing against a polypropylene ply.

3. The packaging film as claimed in claim 1, wherein the sealing ply has a thickness of 4–50 µm.

4. The packaging film as claimed in claim 1, wherein the thermoplastic polymers used are polyolefins, polyamides, polyurethanes, polyesters, polyvinyl chloride or mixtures thereof.

5. The packaging film as claimed in claim 1, wherein the base ply b is monolayer and consists of only one ply $b_1$ comprising a polyolefin which may contain fillers.

6. The packaging film as claimed in claim 5, wherein the polyolefin used is a polypropylene homopolymer, a highly crystalline polypropylene homopolymer or a mixture with a polypropylene block copolymer or a random block copolymer or a polypropylene random copolymer, the copolymers containing a minor amount of other $C_2$- to $C_{10}$-alkenes.

7. The packaging film as claimed in claim 1, wherein the base ply b is multilayer and comprises a ply $b_1$, which may contain fillers, and a top ply $b_2$, $b_2$ comprising a polypropylene homopolymer, a highly crystalline polypropylene homopolymer or a thermoplastic, such as polyamide, polyethylene terephthalate, polycarbonate or polyoxyalkylene, having heat distortion resistance.

8. The packaging film as claimed in claim 7, wherein the top ply $b_2$ comprises a thermoplastic having heat distortion resistance or comprises paper, and wherein one or more adhesion promoter plies $b_3$ are present between the plies $b_1$ and $b_2$.

9. The packaging film as claimed in claim 1, wherein the base ply b is multilayer and comprises the plies $b_1$, $b_2$ and $b_3$ and an additional barrier ply $b_4$, the ply sequence being $b_1$-$b_3$-$b_4$-$b_3$-$b_2$ or $b_1$-$b_3$-$b_4$-$b_2$ and the barrier ply $b_4$ comprising polyamide, polyethylene terephthalate or ethylene vinyl alcohol.

10. The packaging film as claimed in claim 1, wherein a lacquer layer, a paper layer, a metal layer or a metal oxide layer comprising $SiO_2$, $Al_2O_3$ or MgO, which optionally is lacquered, is applied to the outer surface of the base ply.

11. A method for packaging an article which comprises packaging said article in the film as claimed in claim 1.

* * * * *